United States Patent Office 2,999,850
Patented Sept. 12, 1961

2,999,850
SULFONE POLYESTERS
Donald M. Young, Geneva, Switzerland, and Christian F. Horn, New York, N.Y., assignors to Union Carbide Corporation, a corporation of New York
No Drawing. Filed Oct. 7, 1957, Ser. No. 688,425
14 Claims. (Cl. 260—75)

This invention relates to novel polyesters and shaped articles such as filaments, films, coatings and molded products thereof, as well as to a method for their preparation.

In accordance with the invention, it has been found that polyesters having recurring structural units of the general formula

I.     —OR″OOCRSO$_2$R′SO$_2$RCO— wherein the R's are divalent arylene radicals, R′ is a divalent saturated alkylene radical and R″ is a divalent saturated alkylene, alkylene ether or aralkylene radical, can be prepared by reaction of alpha, omega diols containing from two to ten carbon atoms with arylene disulfones of the general formula

II.     R′[SO$_2$RCOOX]$_2$ in which the R's and R′ are as defined in Formula I and the X's are H or lower alkyl radicals capable of forming an alcohol that has a boiling point below about 200° C.

The polyesters of the invention, and shaped articles thereof, have a considerable number of important advantages. They are crystalline, fiber-forming linear polymers having melting points predominantly within the range of about 180 to 270° C., a high degree of chemical stability, insolubility in water, dilute inorganic and organic acids, alkalies, and most organic solvents. They are capable of absorbing coloring materials and are therefore readily dyed. They possess good dielectric properties and moisture regain and are bright, tough resins that can readily be formed into fibers and films which, upon being cold-stretched, have excellent strength, resiliency and pliability.

The disulfones that are preferred as starting materials in accordance with the method of the invention are those identified in Formula II in which the R's are para-phenylene radicals, R′ is an unsubstituted polymethylene chain and the X's are methyl groups. Dimethyl 4,4′-(tetramethylenedisulfonyl)dibenzoate and dimethyl 4,4′-(hexamethylenedisulfonyl)dibenzoate are typical of the preferred disulfones. Higher alkyl diesters, i.e., in which the X's are ethyl, propyl, etc., are operable so long as the terminal alkyl radicals are capable of forming alcohols boiling below about 200° C. The corresponding acids, acid chlorides, diamides and other polymerizable derivatives are likewise operable.

The disulfones can be prepared in several ways. One method of preparation that has been found suitable involves reacting an alkylene dichloride, R′Cl$_2$, in which the R′ is as defined with reference to Formula I, with a salt of a mercapto carboxylic acid, HSRCOOH, in which the R is as defined with reference to Formula I, prepared by reacting the acid with sodium hydroxide in the presence of aqueous ethanol, to form the corresponding dithio dicarboxylic acid, oxidizing the acid thus formed with peracetic acid or other suitable oxidizing agent to convert it into the corresponding disulfonyl dicarboxylic acid and esterifying it with the appropriate alcohol. An entire sequence of reaction for forming a disulfonyl dicarboxylic acid and then esterifying it to the corresponding dimethyl ester is illustrated as follows:

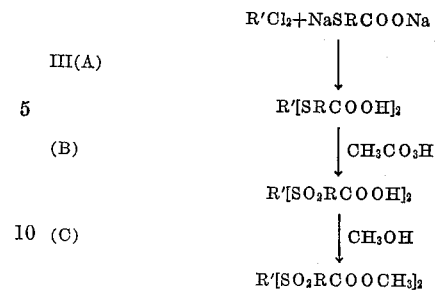

The alpha, omega diols that are suitable as starting materials in accordance with the invention include, as indicated in the definition of R″ in Formula I, dihydroxy compounds of the general formula

IV.     R″(OH)$_2$ in which R″ is a divalent saturated alkylene, alkylene ether or aralkylene radical containing from two to ten carbon atoms. These include particularly alpha, omega polymethylene glycols of the formula HO(CH$_2$)$_n$OH in which $n$ is an integer from 2 to 10, branched chain and alkylene ether alpha, omega glycols such as 3-methyl-1,5-pentanediol and triethylene glycol, and para-dialkylene phenylene glycols such as para-xylylene glycol and the like.

The reaction of the primary starting materials in forming substantially linear polycondensates is believed to take place in essentially two stages, an ester exchange reaction and a polycondensation. While there is reason to believe that these stages are not necessarily separate and distinct and that they may at least in part take place simultaneously, the mechanism of the reactions is set forth to facilitate ready comprehension of the method involved:

V.     $x$XOOCRSO$_2$R′SO$_2$RCOOX+2$x$R″(OH)$_2$

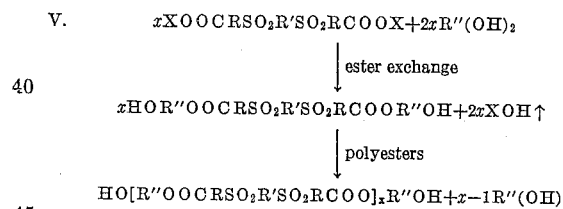

It will be evident that the ester exchange reaction involves substantially complete elimination of the X alkyl radicals in the form of the corresponding alcohol and that the polycondensation involves the elimination of excess glycol. It follows that for most effective preparation of the linear polymers, the alkyl radicals X should be lower alkyl, preferably methyl, radicals so that the resulting alcohol will have a relatively low boiling point, or at least a lower boiling point than the excess glycol eliminated in the second stage. It is also apparent that the boiling point of the glycol used as initial reactant is at least partially determinative of the conditions for polycondensation and removal of excess glycol. If a relatively low boiling glycol, e.g., ethylene glycol, is used, it can be used in considerable excess because a substantial amount can be distilled without in the least degrading the polymer through thermal decomposition. If, however, a higher boiling glycol such as 1,10-decanediol is used, it is desirable to use a smaller excess.

The initial reactants are admixed, preferably with a catalyst, and subjected to conditions producing ester interchange until the ester interchange is substantially complete. These conditions involve heating the reactants to a temperature sufficiently high to bring about the reaction and to eliminate the alcohol formed thereby. Temperatures of the order of about 150 to 250° C. are ordinarily sufficient to initiate and complete the ester interchange. For polycondensation and elimination of the glycol, the temperature employed is above the melting point of the polymer, below the temperature at which the polymer becomes thermally unstable and above the boiling point of the glycol under the pressure conditions of operation. As a rule, this temperature of polycondensation is advantageously about 8 to 30° C. above the melting point of the polymer. If the boiling point of the glycol to be eliminated is substantially higher than this temperature, the polycondensation can be carried out under reduced pressure so as to assure complete removal of excess glycol from the melt. Polycondensation temperatures within the range of 180 to 285° C. and preferably between about 210 and 280° C. lead to uniformly good results although departures from these temperatures, i.e., as high as 300° C., may be permissible if some discoloration and degradation is not considered unduly detrimental.

The reactions should be carried out under an inert atmosphere such as nitrogen and may proceed at atmospheric, reduced, or superatmospheric pressure. In the preferred embodiment of the method of the invention, a stream of nitrogen is passed through the melt so as to provide an inert atmosphere and at the same time agitate the reactants to assist in removing the alcohol or glycol distilled from the reaction mixture. When glycols are used that boil at temperatures too high for easy elimination at atmospheric pressure and at temperatures unduly close to or above the temperature of thermal degradation of the monomers or polymers, it is desirable to sweep excess glycols out of the melt with an inert gas such as nitrogen, or to operate under reduced pressure as indicated earlier, or to use a combination of these measures.

The reaction may also be carried out by means of the solution polymerization technique that involves dissolving the starting materials in an inert solvent such as a paraffin oil or other high boiling aliphatic or aromatic hydrocarbon containing no reactive groups, followed by heating at elevated temperatures under a nitrogen atmosphere until the desired degree of polymerization has been reached or the molecular weight of the product is high enough to precipitate from the hot solution.

In starting with a glycol and a disulfone diester, ester interchange catalysts are preferably used. These include such well known catalysts as metallic lithium, sodium, potassium, calcium, beryllium, magnesium, zinc, cadmium, aluminum, chromium, manganese, iron, cobalt, nickel, silver, mercury, tin, lead, bismuth, antimony, platinum and rhodium. The alcoholates, oxides and salts of many of these metals with weak inorganic and organic acids are also useful as catalysts in the ester interchange and polymerization reaction. In addition, titanium alkoxides, organotin compounds, alkali hydrides, and the like, are suitable as catalysts for the polymerization. If the disulfone diacids, i.e., where X=H, are used, it is preferable to employ either no catalyst or small amounts of catalysts such as para-toluenesulfonic acid, zinc chloride, boron trioxide, camphor-sulfonic acid, or the like.

The amount of catalyst used is preferably within the range of about 0.005 to about 0.5% and preferably between about 0.05 and 0.25% based on the total amount of disulfone that is used. Departures from these ranges are permissible. However, the use of more than about 0.5% may result in discoloration of the ultimate polymer and amounts less than about 0.005% will reduce the rate of reaction to an extent that would not be practicable for commercial operation.

The molar proportion of glycol used in the reaction should, as indicated in Equation V, at least equal and preferably be at least twice the molar amount of disulfone. When a readily removable glycol such as ethylene glycol is used, there is some advantage in using a higher proportion of glycol, e.g., up to about ten mols per mol of disulfone, inasmuch as the glycol will tend to act as a solvent for the catalyst and to assure complete ester exchange. With higher boiling alcohols, however, it is advantageous to use less excess.

It is to be understood, of course, that mixtures of disulfones and mixtures of diols may be employed in order to form copolymers in which the different disulfone and glycol residues are present in ordered or random distribution. The polymers so produced are generally somewhat less crystalline, lower melting and softer than those obtained by using a specific disulfone and a specific glycol.

It is also within the scope of the invention, as will readily be appreciated by those skilled in the art, to start with the saturated glycolic diesters of the disulfones and simply subject them to homopolymerization or to start with two or more such glycolic diesters and subject them to copolymerization, thus avoiding the initial ester interchange reaction of disulfone with glycol.

The method, products and the utility and advantages thereof will become further apparent from the following detailed examples included to illustrate the best modes now contemplated of practicing the invention. In these examples the parts are by weight and the reduced viscosity, used as a measure of the degree of polymerization, is defined by Equation VI:

$$\text{VI.} \quad I_R = \frac{\left(\frac{\Delta N}{N_0}\right)}{C}$$

in which $\Delta N$ is the difference between flow time of solution and flow time of solvent, $N_0$ stands for flow time of solvent and $C$ is the concentration of the polymer in grams per 100 cc. of solution. Unless otherwise specified, reduced viscosity values were obtained at 47° C., the solvent was a 3:2 mixture of phenol and tetrachloroethane and the concentration of the polymer in the solution was 0.2 gram/100 cc.

*Example 1*

Dimethyl 4,4' - (tetramethylenedisulfonyl)dibenzoate (10 parts), ethylene glycol (23 parts), calcium (0.05 part) and zinc borate (0.01 part) were charged into a vessel suitable for operation at pressures slightly above atmospheric pressure and equipped with an agitator and a diffuser at the bottom for introduction of nitrogen. The ester exchange reaction was carried out at 180° C. with continuous removal of methanol by forcing a slight nitrogen stream through the melt. After termination of the methanol distillation, the temperature was raised to 260 to 280° C. and maintained at that temperature for seven hours to distill over excess ethylene glycol and complete the polycondensation reaction.

The resin obtained was fiber-forming and had a reduced viscosity of 0.34. Its melting point was found to be 267° C.

*Example 2*

Dimethyl 4,4' - (tetramethylenedisulfonyl)dibenzoate (10 parts), 1,6-hexanediol (10 parts) and 0.01 part calcium (dissolved in a little ethylene glycol) were heated in a condensation vessel to 200° C. to bring about an intial ester exchange. The removal of the methanol was assisted by a stream of nitrogen which was forced through the melt. Thereafter, excess hexamethylene glycol was distilled out under reduced pressure (165 mm.). The temperature was raised during this procedure to 230° C. At this temperature the polymerization was performed under reduced pressure (75 mm.) in a nitrogen atmosphere over a period of 8.8 hours.

The final polymer was white and appeared to be a very tough fiber-forming resin. The reduced viscosity was 0.41, the melting point of the polymer at 222 to 224° C.

*Example 3*

Dimethyl 4,4' - (tetramethylenedisulfonyl)dibenzoate (114 parts), 1,10-decanediol (131 parts), magnesium acetate (0.1193 part) and tetraisopropyl titanate (0.0796 part) were heated in nitrogen atmosphere to 210° C. to carry out the ester exchange. After the glycol excess was distilled out at 230° C., the temperature was increased to 235° C. and the polymerization was performed over a period of eleven hours at reduced pressure (2 mm. Hg). A light ivory polyester was obtained which had a reduced viscosity of 0.91 and a melting point of 218 to 221° C.

The polymer was melt-spun by a plunger-type extrusion machine at 240° C. using a 30-hole 0.015" spinneret. The filaments formed were drawn over a hot-pin at 83° C. to an extent of 337% into 160 denier filaments. The following physical properties were obtained, the dye affinity being measured in terms of the percentage of total dye absorbed after 120 minutes dyeing:

| | |
|---|---|
| Tenacity, g.p.d. | 2.3 |
| Elongation, percent | 14 |
| Dye affinity, percent | 59 |
| Resiliency | Excellent |

This data shows that outstanding dyeability and excellent resilience represent two of the most striking advantages of this fiber over synthetics in current use. The tenacity is within the range for a pilling-resistant staple fiber. The excellent resilience of the fiber is further demonstrated by the results, tabulated below, of comparative tests with polyethylene terephthalate (PET):

| Stretch, Percent | Immediate Recovery, Percent of Total Stretch | |
|---|---|---|
| | Filaments of Example 3 | Filaments of PET |
| 1 | 95 | 92 |
| 2 | 92 | 61 |
| 3 | 83 | 46 |
| 5 | 46 | 38 |
| 10 | 26 | 20 |

Recovery of the filaments of Example 3 from stretches as high as 10% is substantially complete after five minutes.

*Example 4*

Dimethyl 4,4' - (tetramethylenedisulfonyl)dibenzoate (10 parts), 1,5-pentanediol (10 parts), magnesium acetate (0.012 part) and tetraisopropyl titanate (0.007 part) were charged to a condensation vessel. After ester exchange was finished, the temperature was raised to 230° C. to distill the glycol excess. Polycondensation was performed between 235 and 245° C. at 1–2 mm. for 5.8 hours until the melt had become highly viscous. All operations were performed in a nitrogen atmosphere.

The polymer obtained was light ivory and could be drawn into fibers which were very strong after having been stretched several hundred percent. The reduced viscosity of the polymer was 0.77, its melting point was 242.5 to 243.5° C.

*Example 5*

Dimethyl 4,4' - (tetramethylenedisulfonyl)dibenzoate (10 parts), 3-methyl-1,5-pentanediol (10 parts), magnesium acetate (0.012 part) and tetraisopropyl titanate (0.007 part) were heated to 200° C. to bring about ester exchange. Thereafter, the excess glycol was distilled out at 210 to 220° C. under reduced pressure (2 mm.) and polymerization was conducted over a period of seven hours between 225 and 245° C. All reaction steps were performed in a nitrogen atmosphere.

The resin obtained could be melt-extruded into strong cold-drawable fibers which showed good flexibility. The reduced viscosity of the resin was found to be 0.80, the melting point was 214.5 to 215° C.

*Example 6*

Dimethyl 4,4' - (tetramethylenedisulfonyl)dibenzoate (10 parts), 1,10-decanediol (10 parts), magnesium acetate (0.012 part) and tetraisopropyl titanate (0.007 part) were charged to a reaction vessel which was heated to 200° C. for 1.5 hours. During this period initial ester exchange took place. In order to remove excess glycol, the temperature was raised to 230° C. and reduced pressure was employed. The actual polymerization was performed at 235° C. and 1–2 mm. pressure for seven hours. All operations were performed in a nitrogen atmosphere.

The polymer obtained was white and could be extruded into strong fibers which showed a cold-stretchability of 500 to 600%. Because of its outstanding toughness, the polymer can also be used in molding applications. The reduced viscosity of the resin was 0.73, the melting point 216 to 218° C.

*Example 7*

Dimethyl 4,4' - (hexamethylenedisulfonyl)dibenzoate (10 parts), 1,10-decanediol (10 parts), magnesium acetate (0.012 part) and tetraisopropyl titanate (0.005 part) were charged into a condensation vessel equipped with a gas diffuser at the bottom and heated for fifteen minutes at 200° C. to bring about the ester exchange. A minimum nitrogen stream was employed. Following the completion of the methanol distillation, the temperature was raised to 235° C. to remove excess glycol. The polycondensation reaction was performed at 235° C. for 3.25 hours using two to three liters/min. nitrogen.

A white resin was obtained having a reduced viscosity, measured at 30° C., of 0.86 and a melting point of 154° C. The polymer possessed excellent fiber-forming and resilience properties.

*Example 8*

Dimethyl 4,4' - (hexamethylenedisulfonyl)dibenzoate (10 parts), 1,6-hexanediol (10 parts), magnesium acetate (0.012 part) and tetraisopropyl titanate (0.005 part) were admixed in a polycondensation reactor equipped with a fine gas diffuser at the bottom. The initial ester exchange was carried out at 200° C. for fifteen minutes while passing a minimum nitrogen stream through the melt. After termination of the methanol distillation, the temperature was adjusted at 230° C. and the excess glycol removed over a twenty-minute period. The final polymerization was conducted for 2.25 hours at 230° C. in a nitrogen atmosphere.

The resulting resin had a reduced viscosity, measured at 30° C., of 0.67 and a melting point of 186° C. Filaments extruded from the melt could be cold-drawn to 500%.

*Example 9*

The general procedure of Example 7 was repeated except that dimethyl 4,4'-(hexamethylenedisulfonyl)dibenzoate (10 parts), 3-methyl-1,5-pentanediol (10 parts), magnesium acetate (0.012 part) and tetraisopropyl titanate (0.005 part) were used in the polymerization reaction. After fifteen minutes of ester exchange reaction at 200° C. the temperature was raised to 230° C. and excess glycol removed. The polycondensation was performed over a 3.25 hour period at 230° C. using two to three liters/min. nitrogen.

The reduced viscosity of the resin, measured at 30° C., was 0.71. The melting point was 154° C. Fibers could be cold-stretched to 500%.

*Example 10*

The general procedure of Example 7 was followed except that dimethyl 4,4'-(hexamethylenedisulfonyl)dibenzoate (10 parts), 1,4-butanediol (10 parts), magnesium acetate (0.012 part) and tetraisopropyl titanate (0.005 part) were employed in the polycondensation. When the initial ester exchange was completed the temperature was raised to 235° C. and the excess glycol was removed. The polycondensation was conducted at 235° C. for 3.5 hours in nitrogen atmosphere.

The resin had a reduced viscosity, measured at 30° C., of 0.68 and could be extruded into filaments which could be cold-stretched 300 to 400%. The melting point of the resin was found to be 232° C.

Example 11

Dimethyl 4,4'-(hexamethylenedisulfonyl)dibenzoate (10 parts), ethylene glycol (10 parts), magnesium acetate (0.012 part) and tetraisopropyl titanate (0.005 part) were admixed in a polycondensation vessel equipped at the bottom for introduction of a finely dispersed nitrogen stream. The initial ester exchange was carried out at 180° C. over a period of fifty minutes with the continuous removal of methanol by a stream of nitrogen. The temperature was raised to 230° C. and the excess glycol was removed. The polycondensation was performed at 230° C. for 4.5 hours while passing a stream of nitrogen (two to three liters/min.) through the melt.

The resulting resin had a reduced viscosity, measured at 30° C., of 0.46 and a melting point of 224° C. Fibers could be cold-stretched 300 to 400%.

It is to be expected that numerous modifications will readily become apparent to those skilled in the art upon reading this description. All such modifications are intended to be included within the scope of the invention as defined in the appended claims.

We claim:

1. A fiber-forming linear polymer consisting essentially of repeating structural units of the general formula

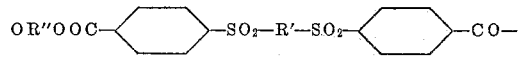

wherein R' is a divalent saturated alkylene radical containing from four to six carbon atoms and R" is a divalent radical selected from the group consisting of saturated alkylene, alkylene ether and aralkylene radicals containing from two to ten carbon atoms.

2. Method which comprises heating a mixture consisting essentially of a disulfone of the general formula

wherein R' is a divalent saturated alkylene radical containing from four to six carbon atoms and the X's stand for members selected from the group consisting of hydrogen and lower alkyl radicals of alcohols having boiling points below about 200° C., with an alpha, omega diol having the general formula $$R''(OH)_2$$

wherein R" is a divalent radical selected from the group consisting of saturated alkylene, alkylene ether and aralkylene radicals containing from two to ten carbon atoms to a temperature up to about 300° C. to obtain a fiber-forming melt.

3. Method which comprises heating a mixture consisting essentially of a disulfone of the general formula

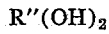

wherein R' is a divalent saturated alkylene radical containing from four to six carbon atoms and the X's stand for members selected from the group consisting of hydrogen and lower alkyl radicals of alcohols having boiling points below about 200° C., with an alpha, omega diol having the general formula $$R''(OH)_2$$

wherein R" is a divalent radical selected from the group consisting of saturated alkylene, alkylene ether and aralkylene radicals containing from two to ten carbon atoms to a temperature of the order of about 150 to 250° C. to effect ester interchange and heating the reaction mixture to a temperature within the range of about 180 to 285° C. to obtain a fiber-forming melt.

4. Method which comprises heating a mixture consisting essentially of a disulfone of the general formula

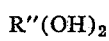

wherein R' is a divalent saturated alkylene radical containing from four to six carbon atoms and the X's stand for members selected from the group consisting of hydrogen and lower alkyl radicals of alcohols having boiling points below about 200° C., with an alpha, omega diol having the general formula $$R''(OH)_2$$

wherein R" is a divalent radical selected from the group consisting of saturated alkylene, alkylene ether and aralkylene radicals containing from two to ten carbon atoms to a temperature of the order of about 150 to 250° C. to effect ester interchange, heating the reaction mixture to a temperature within the range of about 180 to 285° C. to obtain a fiber-forming melt and melt-spinning the resulting resin into filament form.

5. A fiber-forming linear polymer consisting essentially of repeating structural units of the formula

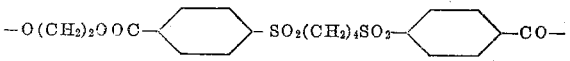

6. A fiber-forming linear polymer consisting essentially of repeating structural units of the formula

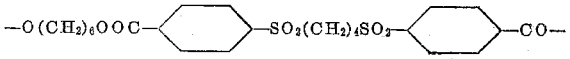

7. A fiber-forming linear polymer consisting essentially of repeating structural units of the formula

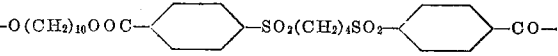

8. A fiber-forming linear polymer consisting essentially of repeating structural units of the formula

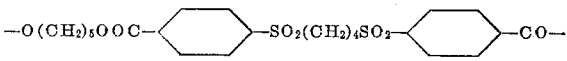

9. A fiber-forming linear polymer consisting essentially of repeating structural units of the formula

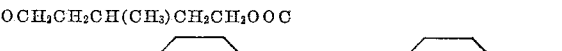

10. A fiber-forming linear polymer consisting essentially of repeating structural units of the formula

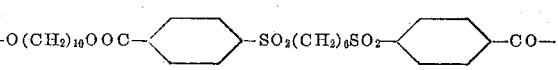

11. A fiber-forming linear polymer consisting essentially of repeating structural units of the formula

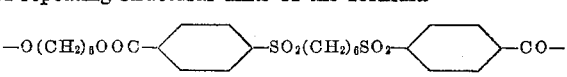

12. A fiber-forming linear polymer consisting essentially of repeating structural units of the formula

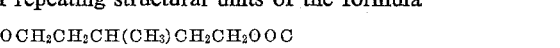

13. A fiber-forming linear polymer consisting essentially of repeating structural units of the formula

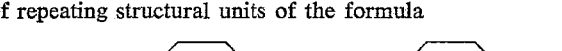

14. A fiber-forming linear polymer consisting essentially of repeating structural units of the formula

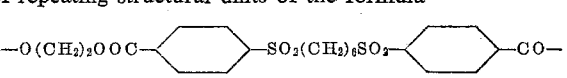

References Cited in the file of this patent

UNITED STATES PATENTS

| | | |
|---|---|---|
| 2,427,640 | Whitehall et al. | Sept. 16, 1947 |
| 2,614,120 | Caldwell | Oct. 14, 1952 |
| 2,720,502 | Caldwell | Oct. 11, 1955 |